US010155525B1

(12) United States Patent
Graben et al.

(10) Patent No.: US 10,155,525 B1
(45) Date of Patent: Dec. 18, 2018

(54) FOLDING FOOT-KICK FOR HAND TRUCK

(71) Applicant: Brennan Equipment and Manufacturing Inc., University Park, IL (US)

(72) Inventors: Kyle Graben, University Park, IL (US); Peter Sullivan, University Park, IL (US)

(73) Assignee: Brennan Equipment and Manufacturing Inc., University Park, IL (US)

( * ) Notice: Subject to any disclaimer, the term of this patent is extended or adjusted under 35 U.S.C. 154(b) by 0 days.

(21) Appl. No.: 15/911,769

(22) Filed: Mar. 5, 2018

(51) Int. Cl.
*B62B 1/00* (2006.01)
*B62B 1/04* (2006.01)

(52) U.S. Cl.
CPC .......... *B62B 1/042* (2013.01); *B62B 2205/23* (2013.01); *B62B 2205/24* (2013.01)

(58) Field of Classification Search
CPC .... B62B 1/00; B62B 1/04; B62B 1/12; B62B 1/008; B62B 2205/23; B62B 2203/05
See application file for complete search history.

(56) References Cited

U.S. PATENT DOCUMENTS

| | | | | |
|---|---|---|---|---|
| 193,401 A | * | 7/1877 | Ferris | B62B 1/10 280/47.27 |
| 2,546,876 A | * | 3/1951 | Sutherland | B62B 1/14 280/47.27 |
| 3,035,727 A | * | 5/1962 | Turner | B62B 1/14 280/47.27 |
| 7,387,306 B2 | * | 6/2008 | Zimmer | B62B 1/125 280/40 |
| 7,431,314 B2 | * | 10/2008 | Donaldson | B60B 29/002 280/47.27 |
| 8,136,822 B2 | * | 3/2012 | Harrison | B62B 1/14 280/47.17 |
| 9,096,251 B2 | * | 8/2015 | Bowden | B62B 1/12 |
| 9,302,688 B2 | * | 4/2016 | Reddi | B62B 1/002 |
| 2011/0285113 A1 | * | 11/2011 | Su | B62B 1/12 280/654 |

* cited by examiner

*Primary Examiner* — Brian L Swenson
(74) *Attorney, Agent, or Firm* — Seyfarth Shaw LLP

(57) ABSTRACT

Disclosed is a hand truck with a foot kick that rotates to be placed in a more compact position. The foot kick can include pins that fit within slots to move between the open and closed positions. The hand truck can therefore include a foot kick but still be compact enough to fit through hallways, staircases, and the like.

17 Claims, 5 Drawing Sheets

FOLDING FOOT-KICK FOR HAND TRUCK

TECHNICAL FIELD OF THE INVENTION

The present application relates generally to hand trucks. More particularly, the present application relates to a folding foot kick for a hand truck.

BACKGROUND OF THE INVENTION

Hand trucks are used to move cargo manually from place to place. They generally include a base upon which items are placed and sometimes stacked, and a frame extending upward from the base to support the stacked cargo. Typical hand trucks include a set of wheels provided near the bottom of the frame that allow the hand truck to roll across a floor, and a handle located toward the top of the frame which a user can grip to move the hand truck. During use, the frame is usually tilted rearward to move the hand truck on the wheels.

Foot kicks allow the hand truck to rotate about its wheel axis for easier mobility. For example, a foot kick can extend outward from the base of the hand truck and allow a user to push downward on the foot kick with their foot. This rotates the hand truck about its wheel axis to place the hand truck in the tilted position where the user can more comfortably move the hand truck.

Foot kicks are helpful for moving between the tilted and flat position of the hand truck. Foot kicks can, however, provide spacing concerns if they are not compact enough. By definition, a foot kick must extend outward to provide enough of a lever arm to rotate the hand truck. Some hand trucks include smaller foot kicks to avoid these spatial issues, but smaller and more compact foot kicks may not provide the necessary leverage to lever the hand truck between the flat and tilted positions.

SUMMARY OF THE INVENTION

The presently disclosed embodiments include a hand truck with a foot kick that is rotatable with respect to the frame of the foot kick to place the hand truck in a more compact position. For example, the foot kick can include pins that fit within slots when the foot kick is to be in the closed position, and the foot kick can rest against a cross bar or other structural feature in the open position. A user can therefore utilize a sufficiently large foot kick with enough of a lever arm to lever the hand truck into the tilted position, while at the same time providing the compactness of a smaller foot kick or a hand truck that does not have a foot kick at all.

In particular, the presently disclosed embodiments include a hand truck including a frame having a handle at an upper end of the frame and a crossbar located below the handle, a cargo plate coupled to the frame at a lower end opposite the upper end, a bracket coupled to the frame between the upper and lower ends, and a foot kick rotatably coupled to the bracket. The foot kick includes an arm extending from the bracket at a fulcrum end of the arm and a base coupled to the arm at a lever end of the arm opposite the fulcrum end of the arm. The foot kick is selectively engageable with the bracket proximate the fulcrum end and rotatable about the fulcrum end.

Also disclosed is a hand truck including a frame having a handle at an upper end of the frame and a crossbar located below the handle, a cargo plate coupled to the frame at a lower end opposite the upper end, a bracket coupled to the frame between the upper and lower ends, where the bracket includes an open slot and a closed slot, and a foot kick coupled to the bracket and rotatable between an open position and a closed position. In the open position, the foot kick is disengaged from the open slot, and in the closed position the foot kick is engaged with the open slot.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
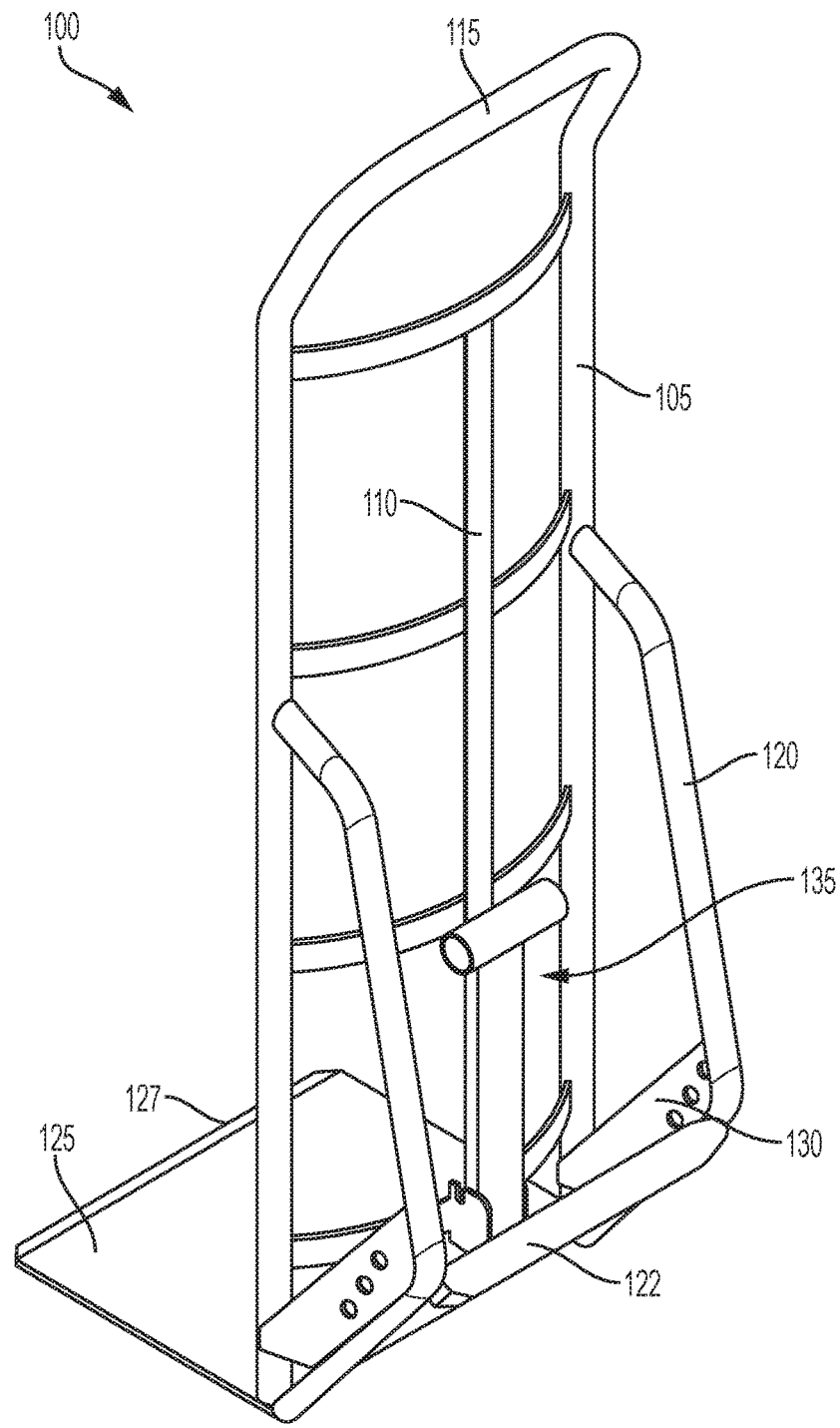
FIG. 1 is a rear perspective view of a hand truck according to at least some of the presently disclosed embodiments.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The presently disclosed embodiments illustrate a hand truck with a foot kick. The foot kick is rotatable so as to be placed in a first position, in which the foot kick is compactly located against the frame of the hand truck, and a second position, in which the foot kick extends outward to receive the foot of a user. The foot kick can include pins that fit within a slot and the foot kick can slide up and down those slots to move between the closed and open position. A user can therefore utilize a sufficiently large foot kick while at the same time avoiding the space constraints of larger foot kicks.

Figure 2:
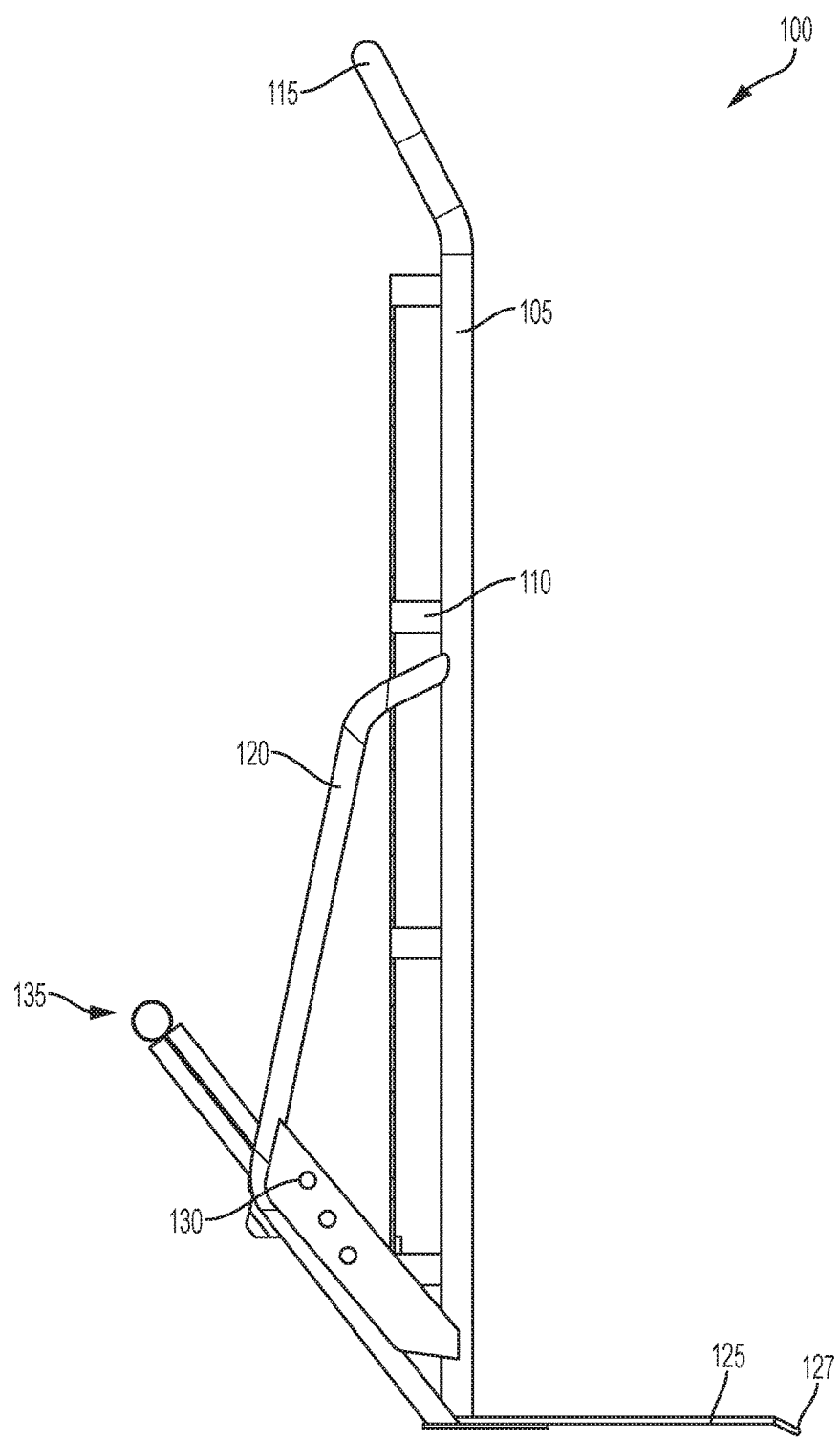
FIG. 2 is a side view of a hand truck with a foot kick in the open position according to at least some of the presently disclosed embodiments.
Figure 3:
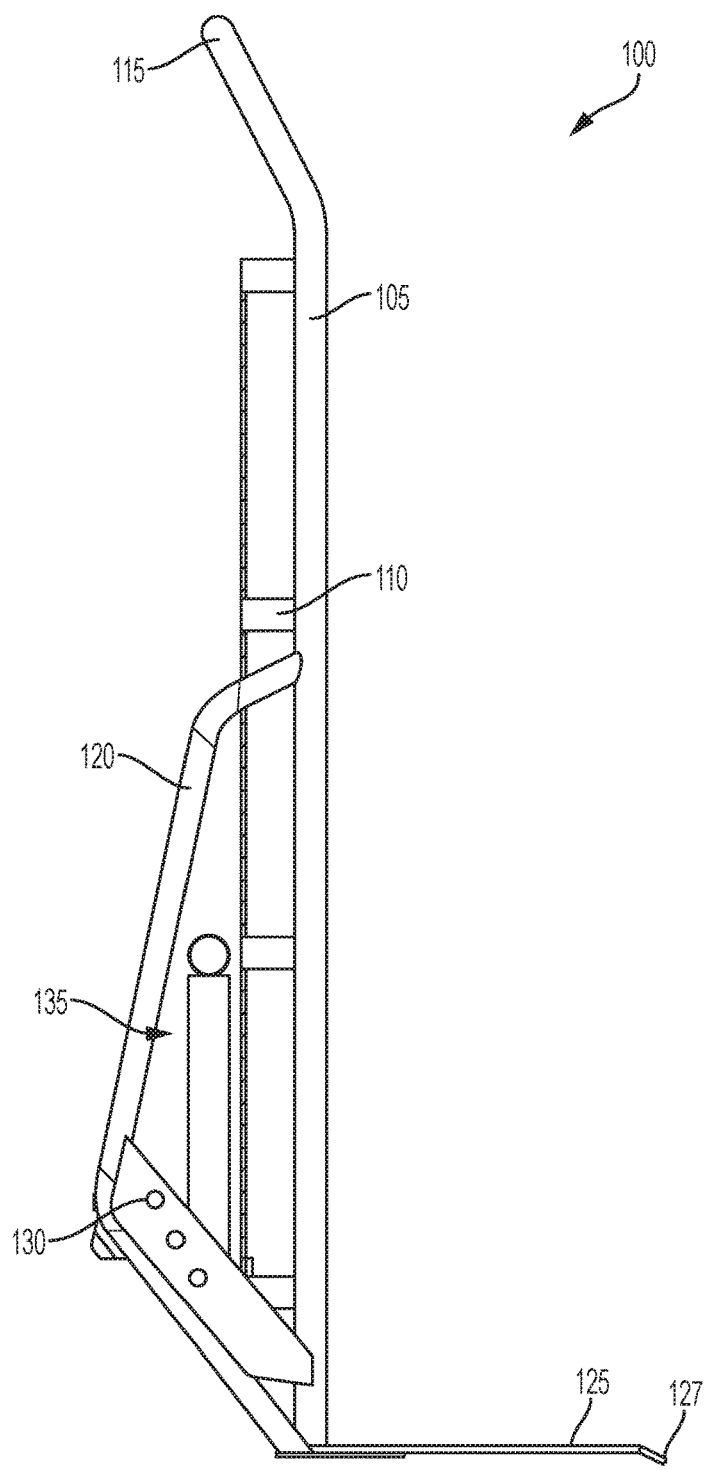
FIG. 3 is a side view of a hand truck with a foot kick in the closed position according to at least some of the presently disclosed embodiments.

As shown in FIGS. 1-3, a hand truck 100 can include a frame 105 having reinforcement members 110 providing structural support and a handle 115 providing a portion for gripping by a user. The hand truck 100 can also include side handles 120 for yet further gripping by a user, and a crossbar 122 coupling the side handles 120 together. During use of the hand truck 100, cargo can be placed on a cargo plate 125, which can include a lip 127. The hand truck 100 can further include braces 130 that couple the side handles 120 to the frame 105 for additional structural stability.

As discussed below in more detail, the hand truck 100 can include a foot kick 135 that can move between a first or open position, in which the foot kick 135 extends outward, and a second or closed position, in which the foot kick 135 is located compactly against the frame 105 of the hand truck 100. For example, in the open position, the foot kick 135 can extend at an angle (e.g., 45 degrees or 90 degrees) with respect to the frame 105, and in the closed position, the foot kick 135 can extend generally parallel with respect to the frame 105. In this manner, the user can disengage the foot kick 135 from its compact closed position and rotate the foot kick 135 to its open position. There, the user can apply their foot on the foot kick 135 and lever the hand truck 100 with their foot. The hand truck 100 can then rotate from an upright position to a tilted position, where the user can more comfortably carry cargo with the hand truck 100. Accordingly, the foot kick 135 can provide the ability to easily transition between the tilted and upright position of the hand truck 100, but without creating spatial issues associated with many foot kicks on hand trucks. The foot kick 135 of the presently disclosed embodiments therefore allows the user to use a hand truck 100 with a foot kick 135 more easily in compact areas such as hallways, stairwells, and the like.

The frame 105 can be any structure that allows a user to stably transport cargo with the hand truck 100. For example, the frame 105 can include the reinforcement members 110 and braces 130 for additional structural reinforcement, or any other measure to provide enough structural stability to withstand the expected cargo load on the cargo plate 125.

The hand truck 100 can include the handle 115 and side handles 120 to allow the user to move the hand truck 100 in an efficient manner. As shown, the handle 115 can be located at the top of the hand truck 100 and allow the user to move the hand truck 100 when in the tilted position, similar to a roller board suitcase. The side handles 120 can allow the user to move the hand truck 100 in other situations, for example, when the hand truck 100 is tilted only slightly or where the user's hands need to be located in a lower position. Often, the side handles 120 are used to more gradually ease the hand truck 100 from the upright to the tilted position.

The side handles 120 can be coupled together by a crossbar 122. The crossbar 122 can simply provide structural support to the hand truck 100 and can additionally provide a base for which the foot kick 135 rests. For example, as shown in FIG. 2, the foot kick 135 can rest on the crossbar 122 when in the open position and the user can press their foot against the foot kick 135 under the brace of the crossbar 122 to lever the hand truck 100 into the tilted position. When the user wishes to store the foot kick 135, the user can rotate the foot kick 135 upward, away from the crossbar 122 and into a more secure position, discussed below in more detail.

As discussed above, the cargo plate 125 can include a lip 127 that can help position the cargo plate 125 underneath a heavy box or other piece of cargo to be carried. For example, the user can slide the cargo plate 125 underneath the cargo by wedging the lip 127 underneath the cargo and pushing the hand truck 100 toward the cargo until the cargo is located on the cargo plate 125.

Figure 4:
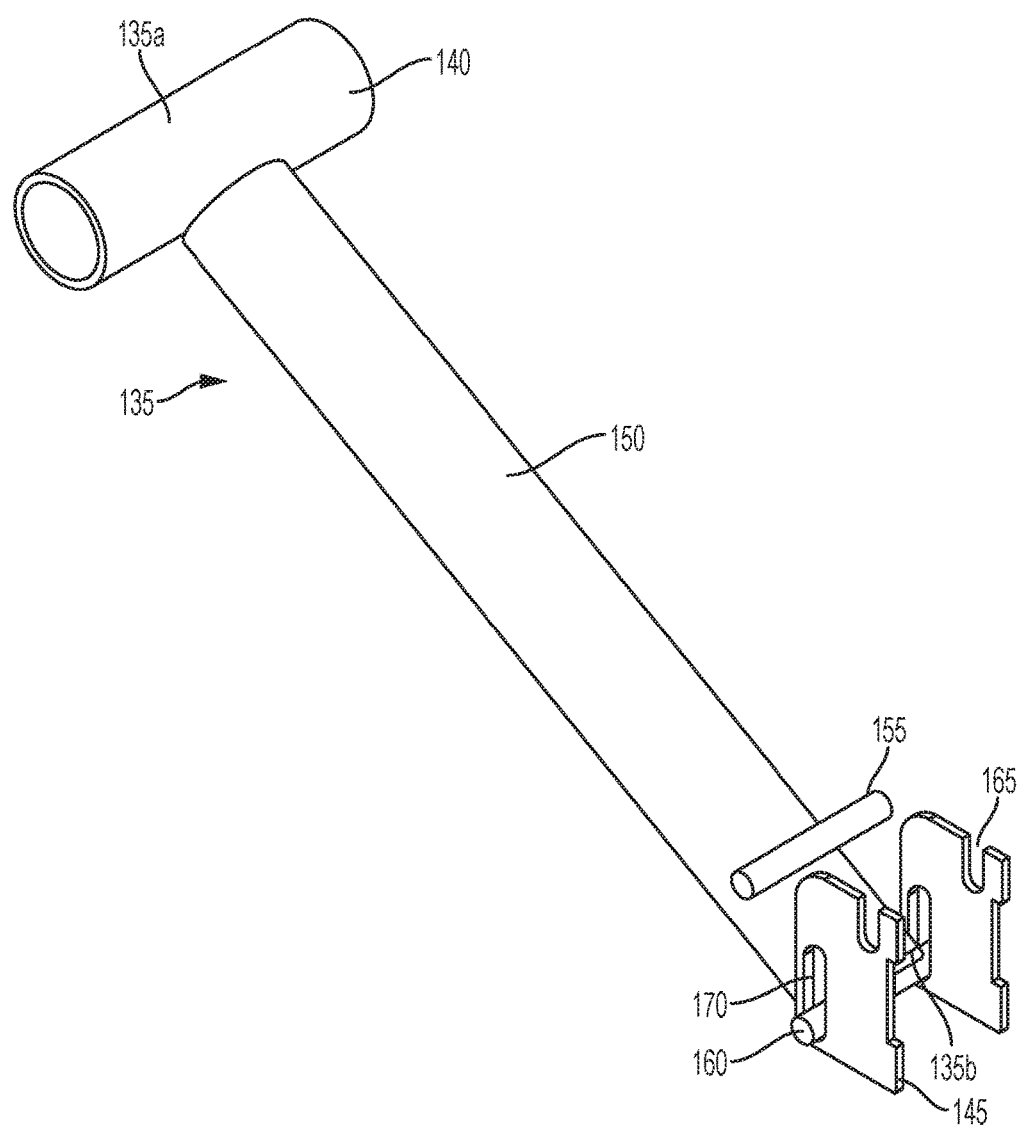
FIG. 4 is a front perspective view of a foot kick in the open position according to at least some of the presently disclosed embodiments.
Figure 5A:
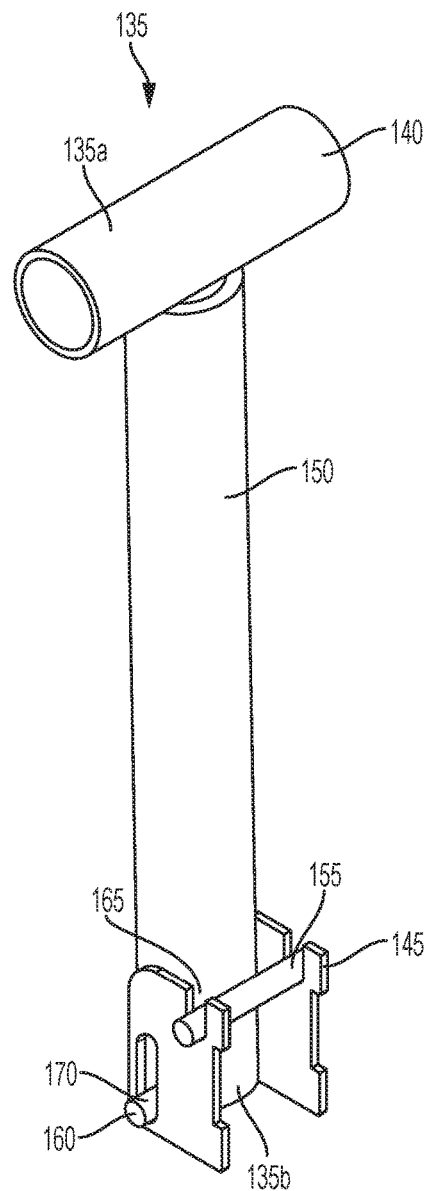
FIG. 5A is a front perspective view of a foot kick in the closed position according to at least some of the presently disclosed embodiments.
Figure 5B:
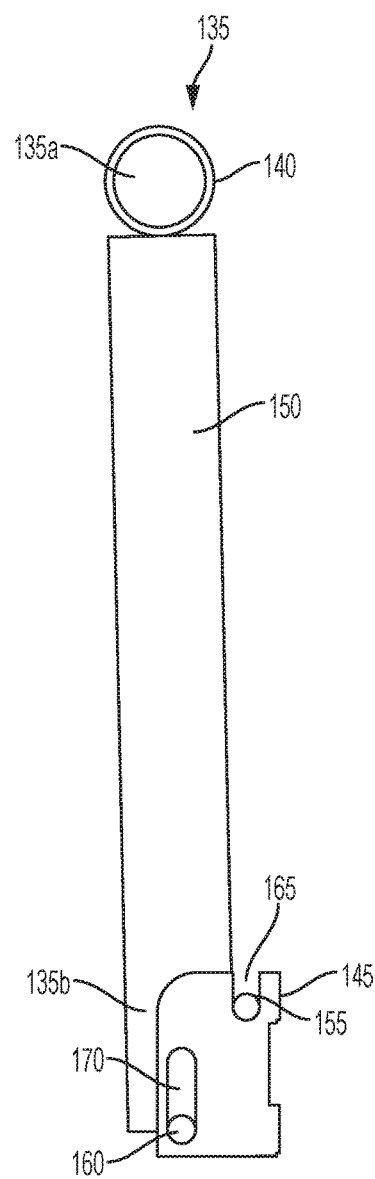
FIG. 5B is a side view of a foot kick in the closed position according to at least some of the presently disclosed embodiments.

FIG. 4 illustrates the foot kick 135 in an open position, and FIGS. 5A and 5B illustrate the foot kick 135 in the closed position. As shown in FIG. 4, the foot kick 135 can include a lever end 135*a* and a fulcrum end 135*b*. The foot kick 135 can rotate about the fulcrum end 135*b* and include a base 140 at the lever end 135*a*. the base 140 can be coupled to a bracket 145 by an arm 150, and the arm 150 can have an upper pin 155 and a lower pin 160 coupled to the arm 150 to provide movable engagement with the bracket 145. For example, the upper pin 155 can fit within an open slot 165, and the lower pin 160 can fit within the closed slot 170.

The base 140 can be any size or shape sufficient to allow a user to press their foot or arm against the base 140 and cause the hand truck 100 to rotate about an axis of the hand truck wheel. For example, the base 140 can be a rod-shaped object, or a rectangular prism, or any other shape that allows a user to maneuver the hand truck 100.

The arm 150 can similarly be any size or shape that allows the foot kick 135 to be used to tilt the hand truck 100. For example, the arm 150 can be longer to provide a larger lever arm for the user to take advantage of when levering the hand truck 100 into the tilted position.

The bracket 145 serves the purpose of coupling the foot kick 135 to the frame 105 of the hand truck 100. The bracket 145 can include the slots discussed herein to engage the arm 150 in both the open and closed positions. For example, and as shown, the bracket 145 can include an open slot 165 that receives the upper pin 155 in the closed position, as shown in FIGS. 5A and 5B. The slots 165, 170 can generally extend vertically, i.e., the same direction that the frame 105 extends. When the user wishes to tilt the hand truck 100 into the tilted position, the user may then remove the foot kick 135 from the bracket 145 by lifting the base 140 or kicking upwardly on the base 140, for example. The lower pin 160 can then move upward within the closed slot 170, and the upper pin 155 can then move upward and out of the open slot 165.

At this point, the foot kick can rotate about the fulcrum end 135*b* of the foot kick 135 and can slide within the closed slot 170. As discussed above, in an embodiment, the foot kick 135 rests against the crossbar 122 when in the open position to provide a brace for the foot kick 135 when a use presses against the handle 140 or the arm 150 during use to tilt the hand truck 100. Once completed, the user can then lift upward on the foot kick 135 once again (for example, with their hand or foot, or in some other manner) and move the lower pin 160 upward within the closed slot 170. The user can then rotate the foot kick 135 toward the bracket 145 and lower the foot kick 135 back into the bracket 145 by engaging the upper pin 155 with the open slot 165. Once in this closed position, the hand truck 100 can then be safely moved with the foot kick 135 compactly enclosed against the frame 105, adding to the versatility of the hand truck 100 in close quarters.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A hand truck comprising:
a frame having a handle at an upper end of the frame and a crossbar located below the handle;
a cargo plate coupled to the frame at a lower end opposite the upper end;
a bracket coupled to the frame between the upper and lower ends;
first and second side handles coupled to the frame between the upper and lower ends, the crossbar coupled to the first and second handles;
a foot kick rotatably coupled to the bracket and having:
an arm extending from the bracket at a fulcrum end of the arm; and
a base coupled to the arm at a lever end of the arm opposite the fulcrum end of the arm, the foot kick selectively engageable with the bracket proximate the fulcrum end and rotatable about the fulcrum end, at least one of the arm and the base of the foot kick contacting the crossbar.

2. The hand truck of claim 1, wherein the bracket includes an open slot and a closed slot, the foot kick includes a lower pin coupled to the arm and an upper pin coupled to the arm above the lower pin, the open slot receiving the upper pin and the closed slot receiving the lower pin.

3. The hand truck of claim 2, wherein the foot kick is rotatable between open and closed positions, the foot kick being generally parallel to the frame in the closed position and angled with respect to the frame in the open position, the foot kick contacting the crossbar in the open position and engaging the bracket in the closed position.

4. The hand truck of claim 3, wherein the frame extends in a vertical direction and wherein the open slot and the closed slot extend in the vertical direction.

5. The hand truck of claim 1, further comprising a lip located at an end of the cargo plate.

6. A hand truck comprising:
a frame having a handle at an upper end of the frame and a crossbar located below the handle;
a cargo plate coupled to the frame at a lower end opposite the upper end;
a bracket coupled to the frame between the upper and lower ends, the bracket including an open slot and a closed slot,
a foot kick coupled to the bracket and rotatable between an open position, in which the foot kick is disengaged from the open slot, and a closed position, in which the foot kick is engaged with the open slot.

7. The hand truck of claim 6, wherein the foot kick includes an arm extending from the bracket at a fulcrum end of the arm and a base coupled to the arm at a lever end of the arm opposite the fulcrum end of the arm, the foot kick selectively engageable with the bracket proximate the fulcrum end and rotatable about the fulcrum end.

8. The hand truck of claim 7, wherein the foot kick includes a lower pin coupled to the arm and an upper pin coupled to the arm above the lower pin, the open slot receiving the upper pin in the closed position and the closed slot receiving the lower pin in the open and closed positions.

9. The hand truck of claim 8, the foot kick being generally parallel to the frame in the closed position and angled with respect to the frame in the open position, the foot kick contacting the crossbar in the open position and engaging the bracket in the closed position.

10. The hand truck of claim 9, wherein the foot kick includes first and second side handles coupled to the frame between the upper and lower ends, the crossbar coupled to the first and second handles and contacting at least one of the arm and the base of the foot kick.

11. The hand truck of claim 10, wherein the frame extends in a vertical direction and wherein the open slot and the closed slot extend in the vertical direction.

12. The hand truck of claim 6, further comprising a lip located at an end of the cargo plate.

13. A hand truck comprising:
a frame having a handle at an upper end of the frame and a crossbar located below the handle;
a cargo plate coupled to the frame at a lower end opposite the upper end;
a bracket coupled to the frame between the upper and lower ends and including an open slot and a closed slot; and
a foot kick rotatably coupled to the bracket, the foot kick having:
an arm extending from the bracket at a fulcrum end of the arm;
a base coupled to the arm at a lever end of the arm opposite the fulcrum end of the arm, the foot kick selectively engageable with the bracket proximate the fulcrum end and rotatable about the fulcrum end;
a lower pin coupled to the arm; and
an upper pin coupled to the arm above the lower pin, the open slot receiving the upper pin and the closed slot receiving the lower pin.

14. The hand truck of claim 13, wherein the foot kick is rotatable between open and closed positions, the foot kick being generally parallel to the frame in the closed position and angled with respect to the frame in the open position, the foot kick contacting the crossbar in the open position and engaging the bracket in the closed position.

15. The hand truck of claim 13, wherein the foot kick includes first and second side handles coupled to the frame between the upper and lower ends, the crossbar coupled to the first and second handles and contacting at least one of the arm and the base of the foot kick.

16. The hand truck of claim 15, wherein the frame extends in a vertical direction and wherein the open slot and the closed slot extend in the vertical direction.

17. The hand truck of claim 13, further comprising a lip located at an end of the cargo plate.

* * * * *